(12) United States Patent
Savage et al.

(10) Patent No.: US 7,322,516 B2
(45) Date of Patent: Jan. 29, 2008

(54) USING A REMOTE TERMINAL TO CONDUCT ASSISTED SELF-SERVICE TRANSACTIONS IN A BANKING FACILITY

(75) Inventors: Gerard Savage, Fife (GB); Norman Taylor, Dundee (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 11/316,038

(22) Filed: Dec. 22, 2005

(65) Prior Publication Data

US 2007/0145115 A1    Jun. 28, 2007

(51) Int. Cl.
*G07F 19/00* (2006.01)
*G06Q 40/00* (2006.01)

(52) U.S. Cl. .................... 235/379; 705/35; 705/43

(58) Field of Classification Search ........ 235/379–382, 235/492; 705/16–18, 35, 39, 41, 43
See application file for complete search history.

(56) References Cited

U.S. PATENT DOCUMENTS

| | | | |
|---|---|---|---|
| 6,305,603 B1* | 10/2001 | Grunbok et al. | 235/379 |
| 6,702,181 B2* | 3/2004 | Ramachandran | 235/380 |
| 6,793,134 B2* | 9/2004 | Clark | 235/379 |
| 7,040,533 B1* | 5/2006 | Ramachandran | 235/379 |
| 2002/0138432 A1* | 9/2002 | Makino et al. | 705/43 |

* cited by examiner

*Primary Examiner*—Thien M. Le
*Assistant Examiner*—April A. Taylor
(74) *Attorney, Agent, or Firm*—John D. Cowart (57) ABSTRACT

A system for use in assisting a financial transaction between a financial-services institution and a customer of that institution includes a display component including circuitry for creating a visual display for a human user of the system and a mobile interface component configured to receive information gathered by a self-service terminal through which the customer engages in the financial transaction. The system also includes a control component configured to receive from the mobile interface component information related to the financial transaction and to deliver the information to the display component for presentation to the user. The display component, mobile interface component, and control component are all packaged in a housing of a size that allows the user to hold the system in one hand while using it.

6 Claims, 6 Drawing Sheets

USING A REMOTE TERMINAL TO CONDUCT ASSISTED SELF-SERVICE TRANSACTIONS IN A BANKING FACILITY

CROSS-REFERENCE TO RELATED APPLICATIONS

This application is related to, and incorporates by reference, U.S. application Ser. No. 11/316,037, titled "Conducting Assisted Self-Service Transactions in a Banking Facility Through a Database Schema," filed on Dec. 22, 2005, by Joseph F. Militello, Mario A. Perittino, Gerard Savage, and Norman G. Taylor.

BACKGROUND

Assisted self-service is becoming increasingly common in many types of consumer transactions, most notably in areas such as retail-store check-out, airport check-in, and fast-food purchasing. These transactions are "self service" in nature in that the consumer is enabled by the underlying self-service technology to perform a transaction with little, if any, assistance from a human representative of the service provider. These transactions are "assisted" in nature in that a human representative of the service provider typically monitors the self-service transaction from a nearby vantage point and is available to help the consumer complete the transaction if need be.

For years the banking industry has been a leader in self-service through the automated teller machine, or ATM. Despite the ubiquity and general familiarity of the ATM throughout much of the world, however, the demand for human involvement in consumer transactions in the banking industry remains high. This is true for at least two reasons: (1) Many banking transactions do not lend themselves to completion on a fully automated self-service machine; and (2) many banking customers simply are not comfortable conducting transactions through an ATM, particularly those who have made a journey to a branch banking facility. The result is that the banking customers continue to rely heavily on direct interaction with the human representatives (the "branch tellers") of the banking institutions, even for transactions that could be conducted without such interaction.

Very recently, banking institutions have begun to explore the possibilities for conducting assisted self-service in their physical branches. Under this model, consumers are able to conduct transactions, at least in part, on a self-service terminal, with assistance from a branch teller if needed. To date, however, attempts at assisted self-service in the banking industry have been rudimentary at best, and the financial institutions are finding it very difficult to conduct these transactions efficiently and effectively in the real-world environment.

SUMMARY

Described below is a system for use in assisting a financial transaction between a financial-services institution and a customer of that institution. The system includes a display component including circuitry for creating a visual display for a human user of the system and a mobile interface component configured to receive information gathered by a self-service terminal through which the customer engages in the financial transaction. The system also includes a control component configured to receive from the mobile interface component information related to the financial transaction and to deliver the information to the display component for presentation to the user. The display component, mobile interface component, and control component are all packaged in a housing of a size that allows the user to hold the system in one hand while using it.

In some systems, the control component is also configured to receive information of other types as well, such as information about an operational status of the self-service terminal through which the customer engages in the financial transaction, or information indicating that the customer needs assistance at the self-service terminal in conducting the financial transaction. The control component is also often configured to provide information to the mobile interface component for delivery to the self-service terminal.

In some systems, the mobile interface component is configured to receive information about multiple financial transactions from multiple self-service terminals at once and deliver this information to the control component. In these systems, the control component is typically configured to deliver the information about the multiple financial transactions at the multiple self-service terminals to the display component for presentation to the user.

In some systems, the control component is also configured to receive a command from the user indicating that the user wants to see additional information about the financial transaction and, in reply, to deliver additional information to the display for presentation to the user. The display component is often configured to detect an action by the user and deliver a signal to the control component in response to this action and, to this end, often includes a touch-enabled display.

In some systems, the mobile interface component includes a wireless interface component, such as radio frequency (RF) transceiver and antenna. Certain systems also include a user-authentication component, such as a biometric sensor, configured to control access to the system.

In some systems, the control component is configured to retrieve the information that it receives from the mobile interface component from an external storage system in which data is stored according to a predefined database schema.

Other features and advantages will become apparent from the description and claims that follow.

DETAILED DESCRIPTION

Figure 1:
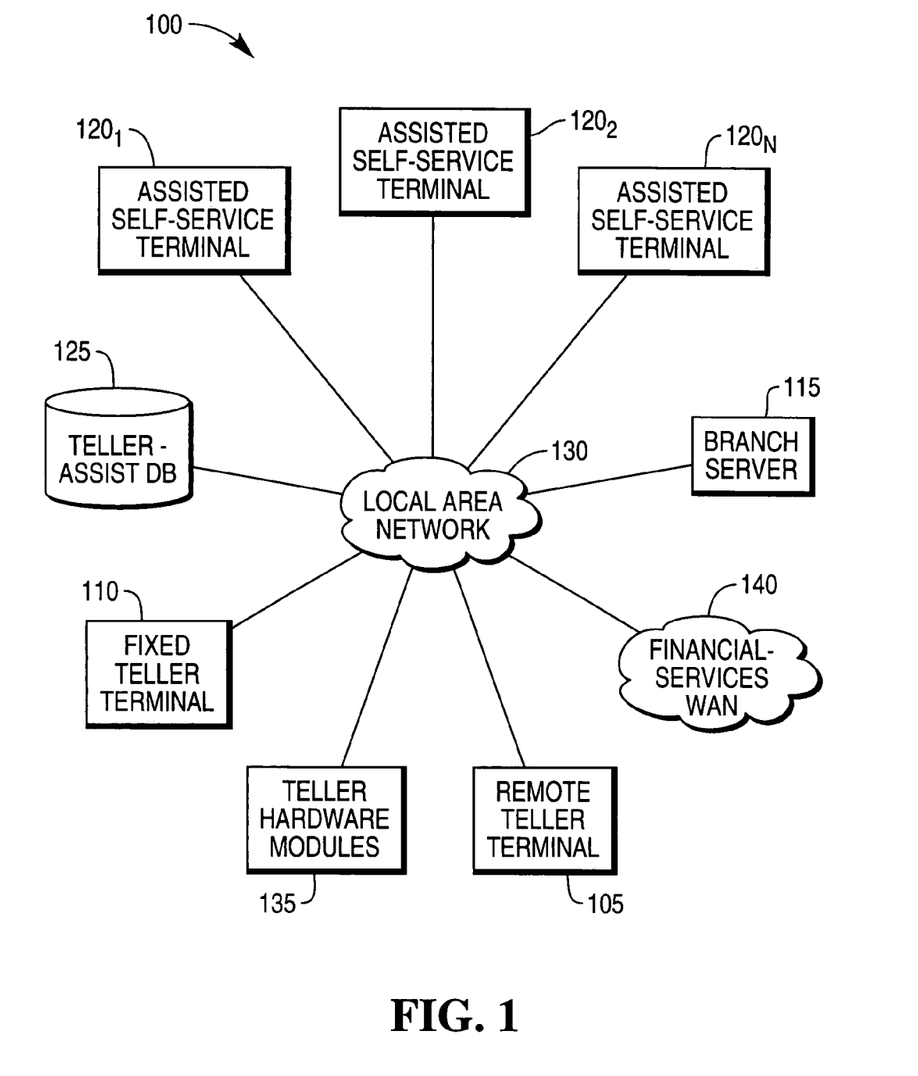
FIG. 1 shows a banking facility that supports assisted self-service transactions with a remote teller terminal.

FIG. 1 shows an example of the infrastructure 100 of a banking facility ("branch") for a banking institution that supports assisted self-service transactions for its customers. The infrastructure includes one or more teller terminals, often consisting of at least one "fixed" teller terminal 110, which is typically a workstation terminal that resides at a fixed location within the branch, such as behind a teller counter, and at least one "remote" teller terminal 105, which is free to roam within the branch or even outside of the branch. Each of the teller terminals interacts with multiple assisted self-service terminals 120$_{1 \ldots N}$, which are used by bank customers to engage in banking transactions that either cannot be completed on traditional ATMs or for which the customers are uncomfortable using an ATM. The fixed teller terminal 110 and remote teller terminal 105 are used by a human representative ("teller") of the banking institution to monitor and, when needed, to assist customers engaged in transactions at the assisted self-service terminals 120$_{1 \ldots N}$. In many cases, the teller terminal 110 and remote teller terminal 105 are also used to complete or fulfill a customer's transactions.

The fixed teller terminal 110, the remote teller terminal 105, and the assisted self-service terminals 120$_{1 \ldots N}$ each connect to a local area network ("branch LAN") 130 that resides in the banking facility. The LAN 130 in turn connects to a wide area financial-services network ("WAN") 140 that links the banking facility to a variety of banking services located outside the banking facility. For many banking institutions, the WAN 140 is a computer network that connects at least some portion, if not all, of the institution's branch locations to a central repository of information and banking services. This repository typically resides on one or more bank host servers, which are usually implemented as computer systems located across the institution's network. The WAN 140 also often connects the banking facility to remote services such as a customer-relationship management ("CRM") service, an electronic-payment-and-deposit ("EPD") processing service, and an ATM switch, which in turns connects to the worldwide ATM network. Bank host servers, CRM servers, EPD processing servers, and ATM switches and networks are all well understood in the banking industry and are not described in any more detail here. Within the banking facility, the LAN 130 also connects the fixed teller terminal 110, the remote teller terminal 105, and the assisted self-service terminals 120$_{1 \ldots N}$ to the bank's branch server 115, a computer system that stores an array of information and provides applications that support the banking transactions that take place in the banking facility. Branch servers like this one are well understood in the banking industry and are not described in any more detail here.

The LAN 130 also connects the fixed teller terminal 110, remote teller terminal 105 and assisted self-service terminals 120$_{1 \ldots N}$ to a teller-assist database (DB) system 125. The teller-assist DB system 125 provides a database schema to serve as a communication mechanism and repository of information for transactions occurring between the fixed and remote teller terminals and the assisted self-service terminals 120$_{1 \ldots N}$. The teller-assist DB system 125 eliminates the need to support many and varying complex messaging interfaces that would otherwise be required in the typical banking facility to support communication between the fixed and remote teller terminals and the assisted self-service terminals 120$_{1 \ldots N}$. In particular, the teller-assist DB system 125 allows, among other things: (1) The teller and assisted self-service terminals to share critical information, such as consumer, account and transaction information, that is obtained through the banking institution's WAN 140 and the existing ATM switch infrastructure; (2) the teller terminal to manage the assisted self-service terminals; and (3) the assisted self-service terminals to report to the teller terminal all consumer and transaction information gathered while executing transactions. The teller-assist DB system 125 and its structure and function are described in more detail below.

The LAN 30 also connects the remote teller terminal 105 to one or more teller hardware modules 135 that typically reside with the fixed teller terminal 110. The teller hardware modules 135 are devices used throughout the banking industry, both in self-service and full-service environments, to conduct banking transactions. Teller hardware modules include devices such as cash dispensers, cash acceptors, coin dispensers, coin acceptors, check acceptors and receipt printers. In some systems, the remote teller terminal 105 itself includes one or more of these teller hardware modules, such as a cash dispenser, to allow fulfillment of at least some customer transactions without accessing the fixed teller terminal 110 or the teller counter. The assisted self-service terminals 120$_{1 \ldots N}$ also often include one or more of these modules to allow fulfillment of transactions at the self-service terminals.

Figure 2:
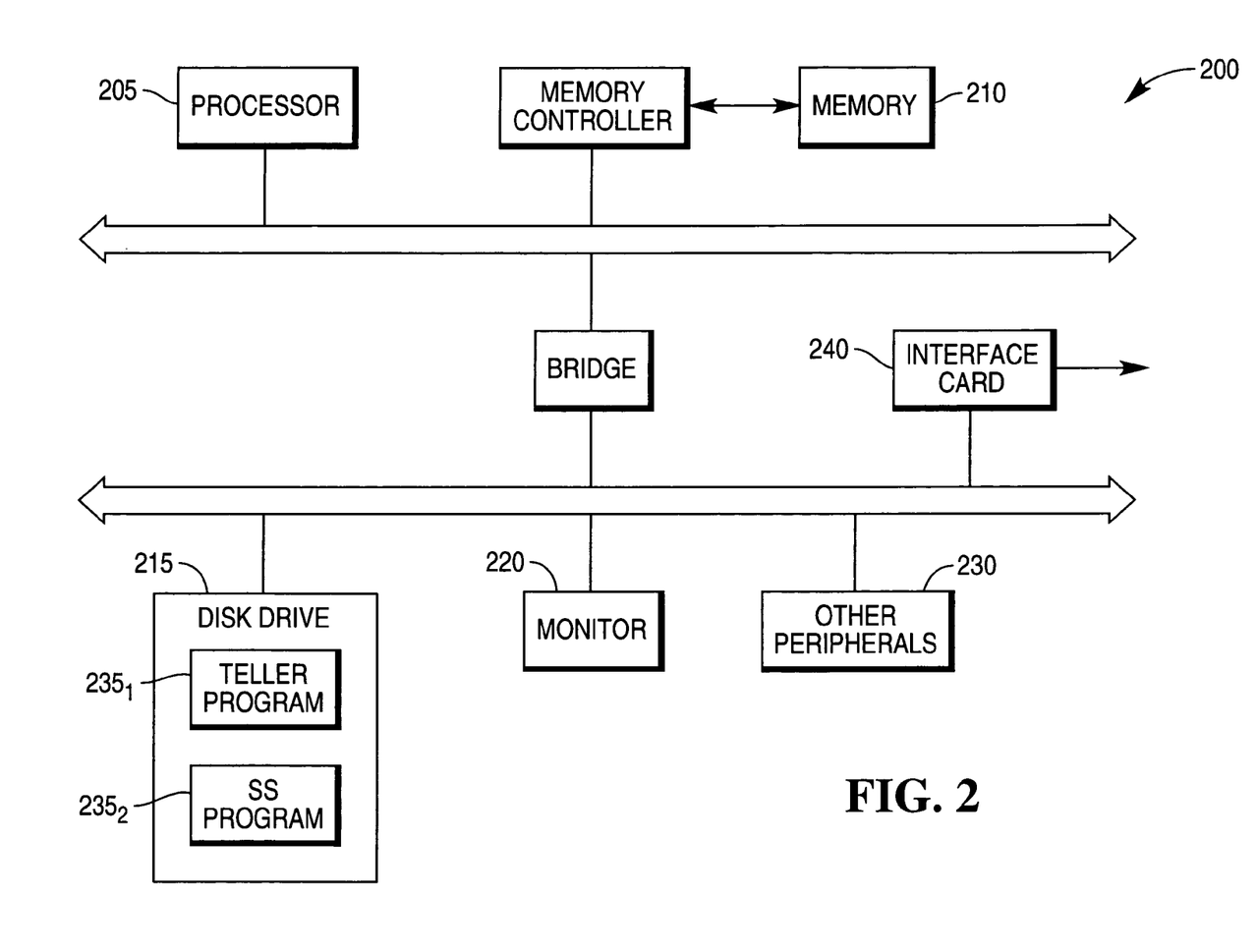
FIG. 2 is a diagram showing a computer system suitable for use in implementing a remote teller terminal.

FIG. 2 shows an example structure for the remote teller terminal 105 of FIG. 1. The remote teller terminal is typically implemented in the form of a handheld computing system 200 having some or all of the following components: one or more processors 205, one or more temporary data-storage components 210 (e.g., volatile and nonvolatile memory modules), one or more persistent data-storage components 215 (e.g., optical and magnetic storage devices, such as hard and floppy disk drives, CD-ROM drives, and magnetic tape drives), and one or more input/output devices, such as a touch-screen monitor 220, a keypad 225, and, in some cases, a biometric sensor 230 (e.g., a fingerprint reader or iris scanner) for user-authentication purposes. The computer system 200 that implements the remote teller terminal also includes a mobile interface mechanism 240, such as a radio-frequency (RF) transceiver and antenna, that allows the terminal to connect to the LAN in the banking facility.

The computing system 200 that embodies the remote teller terminal also includes executable program code, in the form of one or more executable program modules, which are usually stored in the persistent storage media 215 and then copied into memory 210 at run-time. This program code includes a remote teller program 235 that controls the operation of the remote teller terminal as it interacts with the assisted self-service terminals, the teller-assist DB system, and the LAN in the banking facility.

Figure 3:
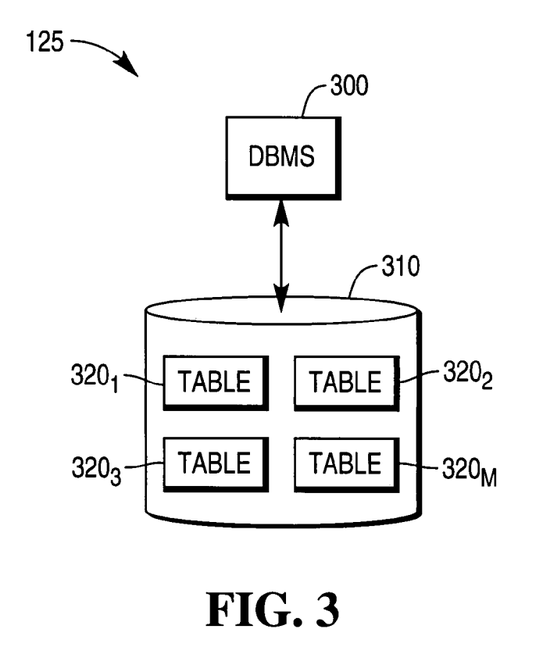
FIG. 3 is a diagram showing the structure of a teller-assist database system.
Figure 4:
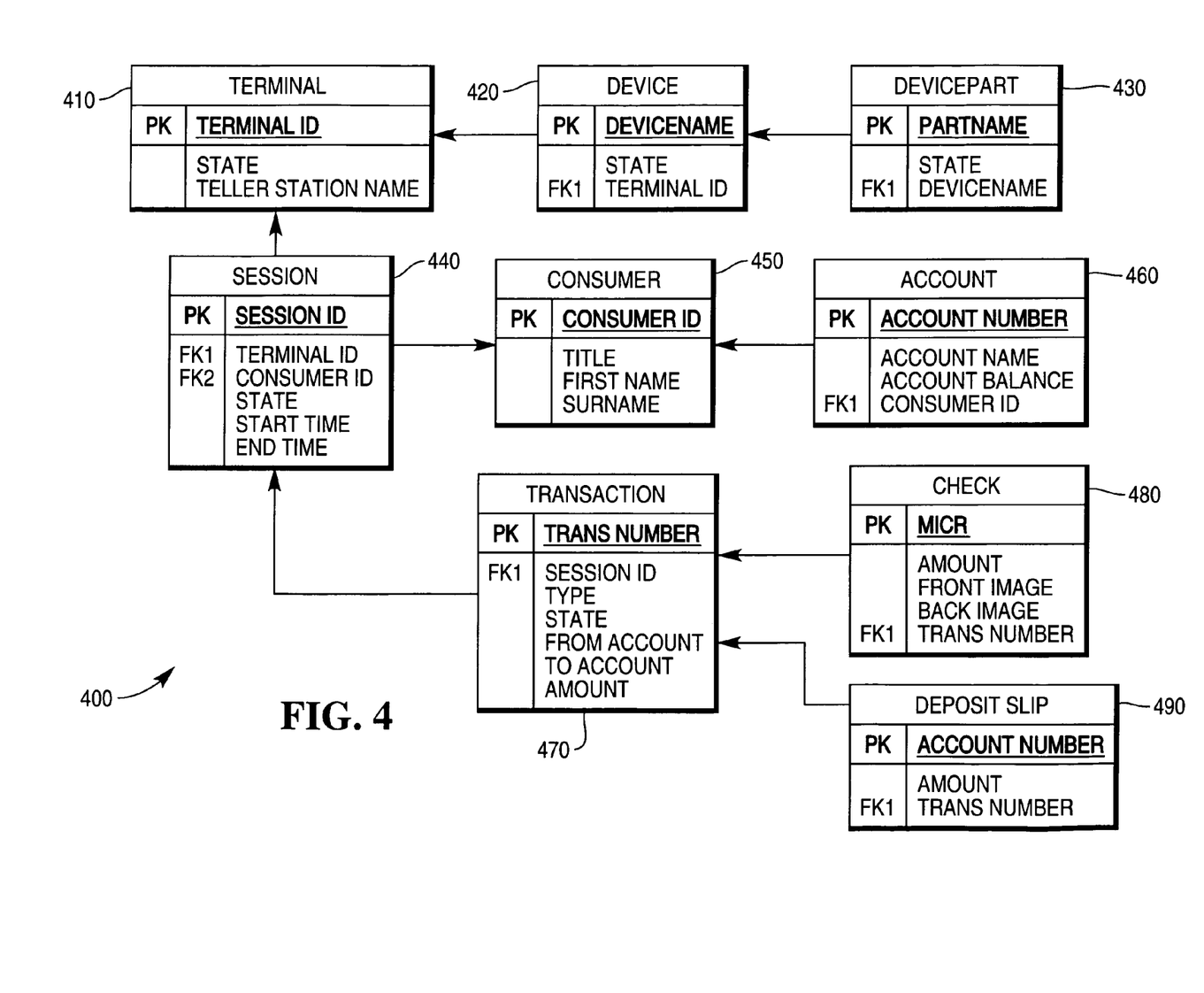
FIG. 4 is a diagram showing a sample database schema for the teller-assist database system of FIG. 3.

FIG. 3 shows one example of a structure for the teller-assist DB system 125 of FIG. 1 in more detail. The DB system 125 as shown here includes a database-management system ("DBMS") 300 that manages data stored in a data-storage facility 310. The data-storage facility 310 stores data in one or more relational tables 320$_{1 \ldots M}$ that are organized according to some predefined database ("DB") schema 400, an example of which is shown in FIG. 4. A database schema, as that term is used in the art of database engineering, refers to the logical structure, or organization, of a database system. In a relational database system, the DB schema defines the relational tables that exist in the DB system, the data fields that make up each table, and the relationships that exist among the fields and the tables. The DB schema is typically defined in a formal language (known as a data definition language, or DDL) supported by the DB system.

As an alternative to the database structure shown in FIG. 3, the transfer of information between the fixed and remote teller terminals and the assisted self-service terminals often takes place not through relational tables managed by a traditional database-management component, but instead through the exchange of one or more files, typically files that embody the Extensible Markup Language (XML) standard put forth by the World Wide Web Consortium (W3C). Under this arrangement, the XML files would replace the relational tables shown in FIG. 3, and a file-management system would replace the database-management system. The XML files and the information that they store, however, would still be governed by a database schema, like the one described below.

FIG. 4 shows an example DB schema 400 defining the logical structure of the teller-assist DB system. The DB schema 400 defines a variety of relational tables (or XML structures) that allow the fixed and remote teller terminals to communicate with the assisted self-service terminals in executing banking transactions. The number and types of tables that exist in any given banking facility will depend upon the characteristics of that facility, including the system configurations of the fixed and remote teller terminals and the assisted self-service terminals, as well as the types of assisted self-service transactions that the facility wishes to support.

The DB schema 400 shown here includes several tables, including a "Terminal" table 410 that includes fields to indicate the ID of each assisted self-service terminal ("Terminal ID"), to indicate the operational state of each assisted self-service terminal ("State"), and to indicate the name of the fixed or remote teller terminal (or both) associated with each assisted self-service terminal ("Teller Station Name"). Linked to the "Terminal" table 410 are a "Device" table 420 and a "Device Part" table 430. The "Device" table 420 includes a field to indicate the name for each device, or module, associated with an assisted self-service terminal ("Device Name"), as well as fields to indicate the state of each device ("State") and the ID of the assisted self-service terminal to which the device belongs ("Terminal ID"). The "Device Part" table 430 includes a field to indicate the name of each component of a device that is to be monitored by a teller terminal ("Part Name"), as well as fields to indicate the state of each component ("State") and the name of the device to which the component belongs ("Device Name").

The DB schema also defines a "Session" table 440 that enables banking customers to engage in banking sessions with the assisted self-service terminals. The "Session" table 440 includes fields to indicate the ID of each customer session ("Session ID"), the ID of the assisted self-service terminal on which each session is taking place ("Terminal ID"), and the ID of the customer who is involved in each session ("Customer ID"). The "Session" table 440 also includes fields to indicate the state of each customer session ("State") and the start and end times for each session ("Start Time," "End Time").

The "Session" table 440 links to a "Consumer" table 450 that includes fields identifying each of the banking facility's customers ("Customer ID"), a title for the customer ("Title"), and the customer's first and last names ("First Name," "Surname"). The "Consumer" table 450 in turn links to an "Account" table 460 that identifies all of the accounts associated with each customer. The "Account" table 460 includes fields that indicate an account number ("Account Number"), an account name ("Account Name") and an account balance ("Account Balance") for each of the customer's accounts, as well as the ID of the customer to whom each account belongs ("Consumer ID").

The DB schema 400 also defines a "Transaction" table 470 that monitors every transaction that a customer engages in during a given banking session. Transactions that might occur during a single banking session include, for example, deposits to one or more accounts, withdrawals from one or more accounts, and transfers of funds between accounts. The "Transaction" table includes fields that indicate, where appropriate, for each transaction the transaction number ("Trans Number"), the ID of the session in which the transaction is taking place ("Session ID"), the type of transaction ("Type"), the state of the transaction ("State"), the accounts involved in the transaction ("From Account," "To Account"), and the amount of money involved in the transaction ("Amount").

Linked to the "Transaction" table 470 are tables indicating the types of documents or instruments associated with each transaction. Examples are a "Check" table 480 and a "Deposit Slip" table 490. The "Check" table 480 includes fields indicating, for each check involved in a banking transaction, the MICR ("Magnetic Ink Character Recognition") code printed on the check ("MICR"), the amount of money drawn on the check ("Amount"), images of the front and back sides of the check ("Front Image," "Back Image"), and the transaction number for the transaction in which the check is processed ("Trans Number"). The "Deposit Slip" table 490 includes fields indicating the account number for the account to which each deposit is made ("Account Number"), the amount of money deposited to the account ("Amount"), and the transaction number for the transaction to which the deposit belongs ("Trans Number").

As stated above, any number of other tables could be defined by the DB schema 400, depending on the needs of the banking facility in which the teller-assist DB system resides. The terms "PK" and "FK" appearing in the database schema 400 of FIG. 4 refer to "primary keys" and "foreign keys" for the various database tables. Primary and foreign keys are concepts well understood in the art of database engineering and are not discussed in any detail here.

Communication between the teller-assist DB system 300 and applications using the system (such as the remote teller program 235 of FIG. 2) occurs through a commonly accepted connectivity standard. Perhaps the most common such standard is the Open Database Connectivity (ODBC) standard developed by the SQL Access Group. Using a standard such as the ODBC standard for communication with the database decouples database access from the structural and operational details of the underlying DB system, which in turn allows the banking facility to choose its database engine and its teller and assisted self-service terminals and application programs independently of each other.

Figure 5:
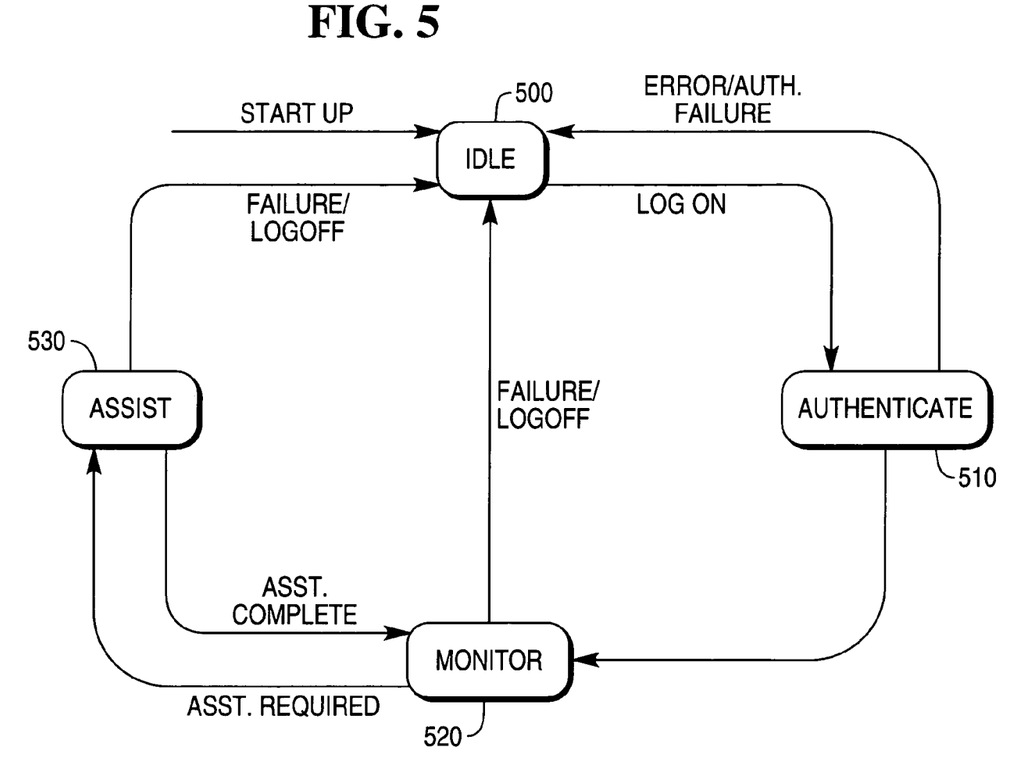
FIG. 5 is a diagram showing state transitions for a remote teller terminal.

FIG. 5 shows an example of state transitions for the remote teller terminal during normal operation. Upon startup, the remote teller terminal enters an "Idle" state 500 in which it waits for a bank employee to engage it. In the "Idle" state 500, the remote teller terminal is "locked" so that it cannot be used for unauthorized banking activity.

When a person engages the remote teller terminal, the terminal enters an "Authenticate" state 510 in which it undergoes an authentication process to ensure that the person attempting to use it is authorized to do so. The authentication process often involves entry of a user-id/password combination and, in some systems, relies on biometric matching to confirm the identity of the user. If the remote teller terminal fails to authenticate the user, or if any error occurs, the terminal returns to the "Idle" state 500. If the authentication process succeeds, the remote teller terminal enters a "Monitor" state 520 in which the terminal begins actively monitoring the assisted self-service terminals for which it is responsible. In the "Monitor" state 520, the remote teller terminal retrieves information from the teller-assist DB system and from the branch host and financial-services network through the branch LAN, as described above. If a failure occurs in the remote teller terminal, or if the teller logs off of the terminal, the terminal ceases its interaction with the assisted self-service terminals and returns to the "Idle" state 500.

When an assisted self-service terminal requests assistance from the teller, the remote teller terminal receives a message indicating that assistance is needed and prompts the teller to assist the customer. If the assistance needed is of a type that requires action on the remote teller terminal, the banker instructs the terminal to enter an "Assist" state 530, in which the terminal interacts with the assisted self-service terminal as needed to move the customer transaction toward completion. In some cases, the teller is able to complete the customer transaction with the remote teller terminal itself. In other cases, the remote teller terminal completes the customer transaction through the teller hardware modules at the teller counter. In still other cases, the customer transaction is completed by the assisted self-service terminal after it receives needed information or teller authorization from the remote teller terminal.

When the teller has finished rendering the assistance requested by the assisted self-service terminal, the remote teller terminal returns to the "Monitor" state 520. Alternatively, if a failure occurs in the remote teller terminal, or if the teller chooses to log off of the terminal, the terminal returns to the "Idle" state 500.

Figure 6:
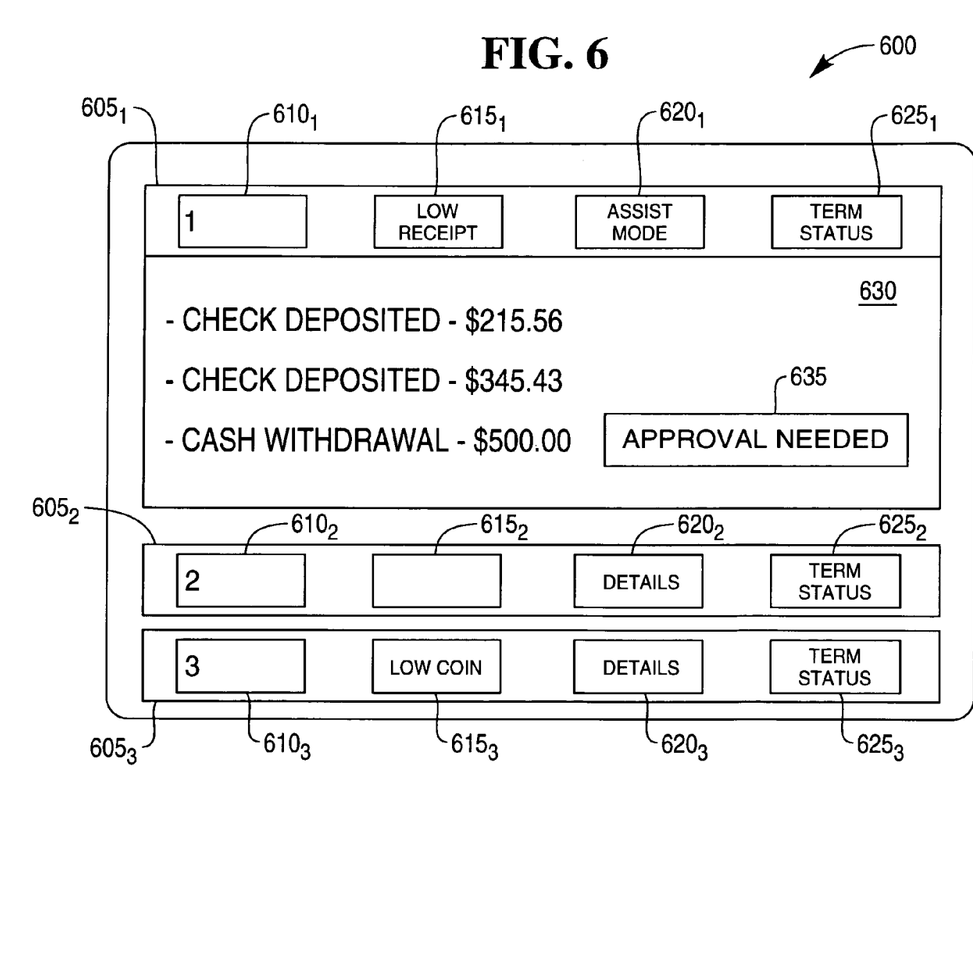
FIG. 6 is a diagram showing a graphical user interface for display on a remote teller terminal.

FIG. 6 shows one example of a graphical user interface, or "remote teller interface" 600, generated by the remote teller program (235 in FIG. 2) to give the bank teller an "at-a-glance" understanding of the status of each assisted self-service terminal ($120_{1 \ldots N}$ in FIG. 1) monitored by the remote teller terminal. The teller can see, for example, whether any of the assisted self-service terminals is engaged by a customer and, if so, what the status of that engagement is and whether the customer needs assistance. The remote teller interface 600 also provides details for the transactions taking place at each of the assisted self-service terminals.

As shown in this example, the remote teller interface 600 is a windows-style interface divided into one or more sections, or "terminal windows," each providing the teller with a view of what is transpiring at one of the assisted self-service terminals. In this example, the remote teller interface 600 is divided into three terminal windows $605_{1 \ldots 3}$ corresponding to three assisted self-service terminals that are monitored by the teller terminal. For each assisted self-service terminal that it monitors, the remote teller terminal assigns the assisted self-service terminal an ID number (e.g., "Terminal 1," "Terminal 2," "Terminal 3"), which is displayed in a "terminal ID" box $610_{1 \ldots 3}$ within the terminal window $605_{1 \ldots 3}$. The terminal ID box also indicates the status of the corresponding assisted self-service terminal, typically using a color-coding scheme. For example, a terminal ID box shaded in green shows that the corresponding assisted self-service terminal is engaged by a customer and that the customer session is progressing normally, with no assistance needed from the teller. A terminal ID box shaded in red (or blinking red, as described below) shows that the assisted self-service terminal is engaged by a customer and that teller assistance might be needed. In some cases, when the terminal ID box suggests that assistance might be needed, the box also provides a text message indicating what type of assistance is needed and whether the teller should approach the customer immediately or wait some period of time before approaching. The following list shows one example of a color-coding scheme used by the remote teller terminal.

No shading=Assisted self-service terminal (ASST) is operating properly and is waiting for customer engagement.

Green=ASST is engaged in a customer session.

Flashing green=ASST replenishables (e.g., receipt paper, coins, cash) are running low.

Yellow=ASST is engaged in a customer session, but teller approval is needed for completion of one or more of the customer's transactions.

Flashing red=ASST is engaged in a customer session, and the customer needs teller assistance.

Red=The terminal is closed or has malfunctioned.

Other boxes $615_{1 \ldots 3}$, $620_{1 \ldots 3}$, $625_{1 \ldots 3}$ within the terminal windows $605_{1 \ldots 3}$ allow the remote teller terminal to display other messages created by the assisted self-service terminals and, in some cases, to initiate actions within the remote teller program itself. For example, the terminal window $605_3$ associated with "Terminal 3" in this example includes a message box $615_3$ showing that the contents of the Terminal 3 coin dispenser are low.

An "Assist Mode" button $620_1$ in the terminal window $605_1$ associated with "Terminal 1" allows the teller to engage in an interactive session with the customer at the corresponding assisted self-service terminal. The terminal window $605_1$ for "Terminal 1" also includes a "Transaction Details" box 630, which provides detailed information on the transactions taking place at the corresponding assisted self-service terminal. For example, the terminal window $605_1$ associated with "Terminal 1" in this example shows that the customer is engaged in three separate transactions: (1) a check deposit of $215.56, (2) a check deposit of $345.43, (3) and a cash withdrawal of $500. Within the "Transaction Details" box 630 is an "Approval Needed" message box 635 indicating that the amount of money that the customer is attempting to withdraw exceeds the bank's self-service limit and therefore requires approval from the teller.

In the example shown here, the terminal windows $605_2$, $605_3$ associated with "Terminal 2" and "Terminal 3" do not include "Transaction Details" boxes like the one found in the terminal window for "Terminal 1." This is so because the display monitor on a handheld computing device is typically too small to allow the display of transaction details in all terminal windows at once. As a result, the terminal windows $605_2$, $605_3$ associated with "Terminal 2" and "Terminal 3" each includes a "Details" button $620_2$, $620_3$, which allows the teller to toggle among the terminal windows to view transaction details for the corresponding assisted self-service terminals. The teller's selection of the "Details" button $620_2$ in the terminal window for "Terminal 2," for example, would close the "Transaction Details" box 630 in the teller window for "Terminal 1" and open a similar box for "Terminal 2."

Each of the teller windows also includes a "Terminal Status" box $625_{1 \ldots 3}$ that allows the teller to gather detailed information about the status of each assisted self-service terminal it monitors. This detailed status information often includes information about the status of the devices and device parts maintained by each assisted self-service terminal. As described above, the teller terminal and the assisted self-service terminals pass information and messages to each other using the relational tables or XML-based files defined by the database schema of the teller-assist DB system (125 in FIG. 1).

The text above describes one or more specific embodiments of a broader invention. The invention also is carried out in a variety of alternative embodiments and thus is not limited to those described here. Many other embodiments are also within the scope of the following claims.

We claim:

1. A system for use in assisting a financial transaction between a financial-services institution and a customer of that institution, the system comprising:
   a display component including circuitry for creating a visual display for a human user of the system;
   a mobile interface component configured to receive information about multiple financial transactions from multiple self-service terminals at once; and
   a control component configured to:
      receive from the mobile interface component information related to the multiple financial transactions; and
      deliver the information to the display component for presentation to the user as the user assists the customer with the financial transaction;
   where the display component, mobile interface component, and control component are all packaged in a housing of a size that allows the user to hold the system in one hand while using the system.

2. The system of claim 1, where the control component is configured to deliver the information about the multiple financial transactions at the multiple self-service terminals to the display component for presentation to the user.

3. A method of assisting a financial transaction between a financial-services institution and a customer of that institution, the method comprising:
   sending information about multiple financial transactions from multiple self-service terminals to a mobile interface component;
   sending information related to the multiple financial transactions from the mobile interface component to a control component;
   delivering the information related to the multiple financial transactions to a display component for presentation to a human user as the user assists the customer with the financial transaction; and
   creating a visual display for the user on the display component;
   where the display component, mobile interface component, and control component are all packaged in a housing of a size that allows the user to hold the system in one hand while using components.

4. The method of claim 3, wherein information about the multiple financial transactions at the multiple self-service terminals is delivered from the control component to the display component for presentation to the user as the user assists the customer with the financial transaction.

5. A program for use in assisting a financial transaction between a financial-services institution and a customer of that institution, the program configured to:
   receive information about multiple financial transactions from multiple self-service terminals at once;
   send information related to the multiple financial transactions through a mobile interface device to a control component;
   send display data to a display component for presentation to a user as the user assists the customer with the financial transaction; and
   create a visual display for the user of the system on the display component;
   where the display component, mobile interface component, and control component are all packaged in a housing of a size that allows the user to hold the system in one hand while using the components.

6. The program of claim 5, wherein the program is further configured to send information about multiple financial transactions at the multiple self-service terminals to the display component for presentation to the user as the user assists the customer with the financial transaction.

* * * * *